United States Patent [19]

Hoffmann et al.

[11] 4,219,183
[45] Aug. 26, 1980

[54] OPERATING MECHANISM FOR VALVES, GATES AND THE LIKE

[75] Inventors: Otto-Horst Hoffmann, Rodenbach; Walter Heil, Neuberg; Friedrich Stark, Langenselbold, all of Fed. Rep. of Germany

[73] Assignee: Leybold-Heraeus GmbH, Cologne, Fed. Rep. of Germany

[21] Appl. No.: 957,583

[22] Filed: Nov. 3, 1978

[30] Foreign Application Priority Data

May 11, 1978 [DE] Fed. Rep. of Germany ....... 2820531

[51] Int. Cl.$^2$ ............................................. F16K 25/00
[52] U.S. Cl. ................................. 251/159; 251/187; 251/228
[58] Field of Search ............... 251/159, 161, 163, 170, 251/187, 228

[56] References Cited

U.S. PATENT DOCUMENTS

| 2,655,942 | 10/1953 | Dougherty | 251/163 |
| 3,109,457 | 11/1963 | Oliveau | 251/159 X |
| 3,185,435 | 5/1965 | Hauser | 251/187 X |
| 3,343,562 | 9/1967 | Combes | 251/187 X |
| 3,695,300 | 10/1972 | Bradel | 251/159 X |

FOREIGN PATENT DOCUMENTS 2211106 3/1972 Fed. Rep. of Germany ........... 251/170

Primary Examiner—Harold W. Weakley
Attorney, Agent, or Firm—Sprung, Felfe, Horn, Lynch & Kramer

[57] ABSTRACT

An operating mechanism for valves and the like comprises a housing with a port situated therein which is to be opened and closed. Associated with the port is a seat and a valve plate for closing the port. A rotatable shaft drive mechanism for the valve plate includes a shaft which rotates in one direction to effect movement of the valve plate from its open position to its closed position followed by a pressing movement over the valve plate against the seat and rotates in the other direction to effect movement of the valve plate in the opposite direction. The rotatable shaft drive mechanism includes an intermittent drive for the transformation of the rotatory movement of the shaft to the desired movement of the valve plate.

5 Claims, 6 Drawing Figures

OPERATING MECHANISM FOR VALVES, GATES AND THE LIKE

BACKGROUND

The invention relates to an operating mechanism for valves and the like, having a housing, a port situated in the housing, which is to be opened or closed by a valve plate, and a seat associated with the port, in which the turning of a shaft in the one direction produces a movement of the valve plate from its open position to its closed position, and thereafter a pressing movement of the valve plate against the seat, and in which a turning of the shaft in the other direction produces movement of the valve plate in the reverse direction.

In operating mechanisms of this kind (cf., for example, the pendulum valve of GB-PS No. 1,050,435) it is important that the valve plate perform no additional lateral movements during the movement by which it is pressed perpendicularly against the valve seat, so that the often very delicate sealing surfaces will not exercise a rubbing action against one another. It is furthermore important that the pressing movement will not be initiated during the movement of the valve plate from its open position to its closed position, thereby producing likewise undesirable friction with the housing. To permit the achievement of such movements of a valve plate with only one rotatory movement of an operating shaft, it is known to provide two levers on the shaft, one of which is temporarily at rest during the turning of the operating shaft, as a result of engaging ratchet mechanisms. Such ratchet mechanisms have a relatively large number of parts moving relatively to one another, including tension or compression springs, whose operation is not absolutely reliable, especially after relatively long use. In the case of formerly known valves of this kind, it can therefore happen that the valve plate will come into contact with housing parts due to premature initiation of the pressing movement, resulting in damage to the sealing surfaces, so that the tightness of the seals deteriorates. Premature contact between the valve plate and the housing can even result in seizure, so that they can no longer be brought completely into the closed position.

THE INVENTION

The object of the present invention is to create an operating mechanism for valves and the like of the kind mentioned in the beginning, which will have very few parts which are movable relative to one another, and in which the two desired movements can take place reliably only in succession while the valve seat and valve plate are positively locked up.

This object is achieved by the invention in that, in an operating mechanism of the kind mentioned above, an intermittent drive is provided to transform the rotatory movement of the operating shaft to the desired movement of the valve plate.

An intermittent drive serves, in a known manner, for the transformation of a continuous rotation to a stepwise movement. For this purpose, a maltese cross drive, for example, has a disk bearing a cam rotatable about a first axis and a tumbler having commonly four concavely arcuate edges adapted to the cam. The cam has at least one opening and a pin disposed in the area thereof. This pin is intended for engagement in slots in the tumbler, which are located between the concave arcuate edges thereof. When the cam revolves, the tumbler revolves as long as the pin is engaged in one of the recesses of the tumbler. When this is not the case, one of the concave arcuate edges of the tumbler is in engagement with the cam, so that the tumbler is locked up.

The present invention is based on the use of the motion of such known intermittent drives for the production of the desired movement of the plate of a valve. Desirably, an intermittent drive designed in the manner of a maltese cross drive can be provided, having a disk pivoting about a first axis and bearing at least a portion of a cam, as well as a tumbler pivoting about a second axis and having at least one concave edge adapted to the cam. In one advantageous embodiment of such a drive, the closing and opening movement is coupled to the movement of the tumbler about the first axis and the pressing movement of the valve plate is coupled with the movement of the disk pivoting about the first axis.

In an actuating mechanism constructed in this manner, it can be reliably brought about that the tumbler will be at rest during a part of the movement of the disk pivoting about the first axis, so that the assurance is automatically provided that the two desired movements will be executed successively. The pressing movement of the valve plate can never take place simultaneously with the opening and closing movements of the valve plate.

BRIEF DESCRIPTION OF THE DRAWINGS

Other advantages and details of the invention will now be set forth in conjunction with embodiments represented in drawings wherein.

DETAILED DESCRIPTION OF THE INVENTION

Figure 1:
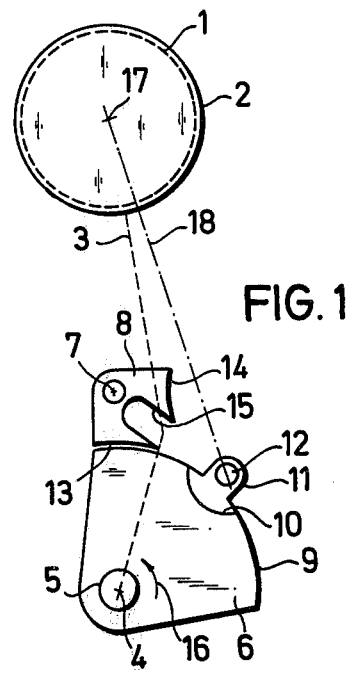
FIGS. 1 to 4 are simplified sketches showing the principle of the invention.
Figure 2:
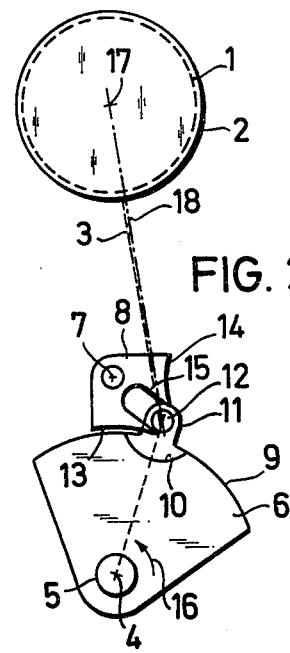
Figure 3:
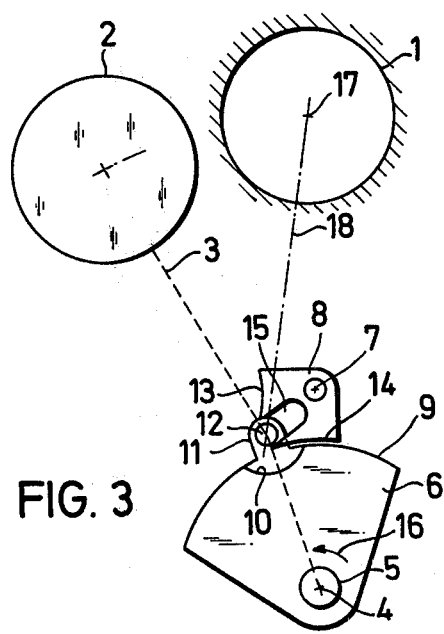

In FIGS. 1 to 4, 1 generally designates a circular port which is closed by means of the valve plate 2 in the position represented in FIGS. 1 and 2. In the positions represented in FIGS. 3 and 4, the valve plate 2 is swung aside so that the port 1 is uncovered. For this purpose the valve plate 2 has an arm 3 represented by a broken line, this arm being mounted for pivoting about the axis 4 at the end opposite the valve plate. About the axis 4 also rotates the actuating shaft 5 whereby the closing and opening movement as well as the movement of pressing the valve plate against the port 1 is to be brought about. In the embodiment represented, therefore, the axis of the actuating shaft 5 and the axis about which the valve plate 2 is pivoted are identical, although this is not necessarily always the case. The actuating shaft 5 is not affixed to the pivot arm 3 of the valve plate 2.

A disk 6 is affixed to the drive shaft 5, forming with a tumbler 8, which is pivoted about the axis 7, a kind of maltese cross intermittent drive. To this end the disk 6 has a circular cam 9 which is provided with an opening 10 and, in the area of this opening 10, a pin 12 mounted on an offset tongue 11. The tumbler 8 has two convex edges 13 and 14 adapted to the cam 9, and it has one slot 15.

With a drive designed in this manner, the turning of the operating shaft 5 can bring about the following movements: FIG. 1 shows the port 1 in the state wherein it is closed by the valve plate 2. At the same time, a wedging or toggle-type mechanism by which the plate 2 is pressed against a seat in the area of the port 1, and which has been omitted from the drawing for the sake of simplicity, is to be engaged. Then, if the shaft 5 is turned in the direction of the arrow 16, the disk 6 will be rocked to the position represented in FIG. 2; the tumbler 8 will not accompany it because the concave edge 13 is engaged with the cam 9. During this first part of the rotation of the shaft 5, the tumbler 8 is securely at rest, while the disk 6 moves. It is therefore desirable for a lever or the like to be coupled either with the shaft 5 or with the disk 6, by which the toggle mechanism is released during this first part of the rotation of shaft 5. Such a lever is indicated by a dash-dotted line drawn to the center 17 of the port 1, and is identified as 18. By comparing FIGS. 1 and 2 it can be seen that such a lever has performed a swinging movement during the above-described first part of the rotation of shaft 5, by which a toggle mechanism can be easily operated. If the shaft continues to turn in the direction of the arrow 16, the pin 12 of disk cam 6 will engage the slot 15 of tumbler 8, so that both parts will move to the position represented in FIG. 3. This second part of the rotation of shaft 5 has therefore been accompanied by the tumbler 8, so that it is desirable to couple the movement of the valve plate 2 to this tumbler, and this can be accomplished in a manner which is not represented in detail in these figures, by fastening to tumbler 8 a driver means which is coupled with the arm 3 of the valve plate 2. This coupling is then to be designed such that, by the swinging of the tumbler 8, the valve plate 2 will be brought from its closed position to its open position.

The movements described above are sufficient for producing no more than an opening and a closing of the port 1 by means of the valve plate 2 and a locking of the valve plate 2 exclusively in its closed position. The right portion of the cam 9 and the concave edge 14 of the tumbler 8 would then be unnecessary. To close the port 1, the shaft would then be turned in the opposite direction from that of arrow 16, so that the above-described movement would take place in reverse.

Figure 4:
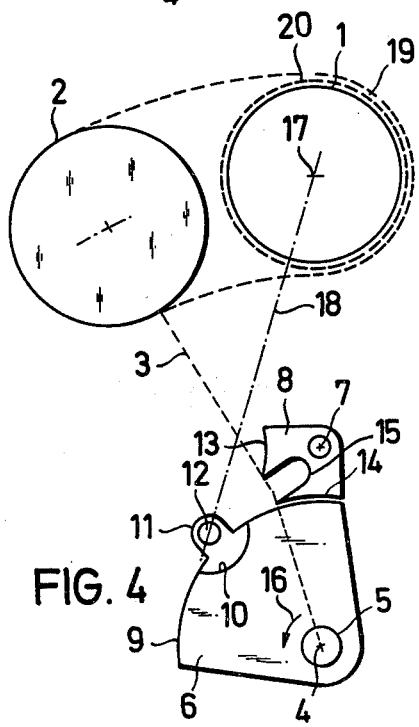

It may be desirable in many cases, however, for a locking action to be produced after the opening movement of the valve plate 2. This is the case, for example, when the valve plate 2 is of a larger type in the form of a plate 19 having an aperture 20 which will be concentric with the port 1 when the valve or gate is in the open position an provides a ring for protecting the gasket. In FIG. 4, such a valve plate 19 is represented by broken lines.

In such an embodiment, it is desirable for the plate 19 to be locked up also in its open position. For this purpose the disk 6 is further turned by the turning of shaft 5 in the direction of the arrow 16, the cam 9 engaging the concave edge 14 of tumbler 8. During this portion of the movement, therefore, the assurance is provided that only the disk 6 will move, while the tumbler 8 remains stationary. This last movement can thus be utilized for the purpose of again operating the toggle mechanism by means of the lever 18.

The closing action of the embodiment indicated in FIG. 4 is likewise brought about by the rotation of the shaft 5 in the direction opposite that of arrow 16. In this manner, the loosening of the toggle mechanism, the swinging of the plate 19 to the closed position, and then another locking movement can be performed successively.

Figure 5:
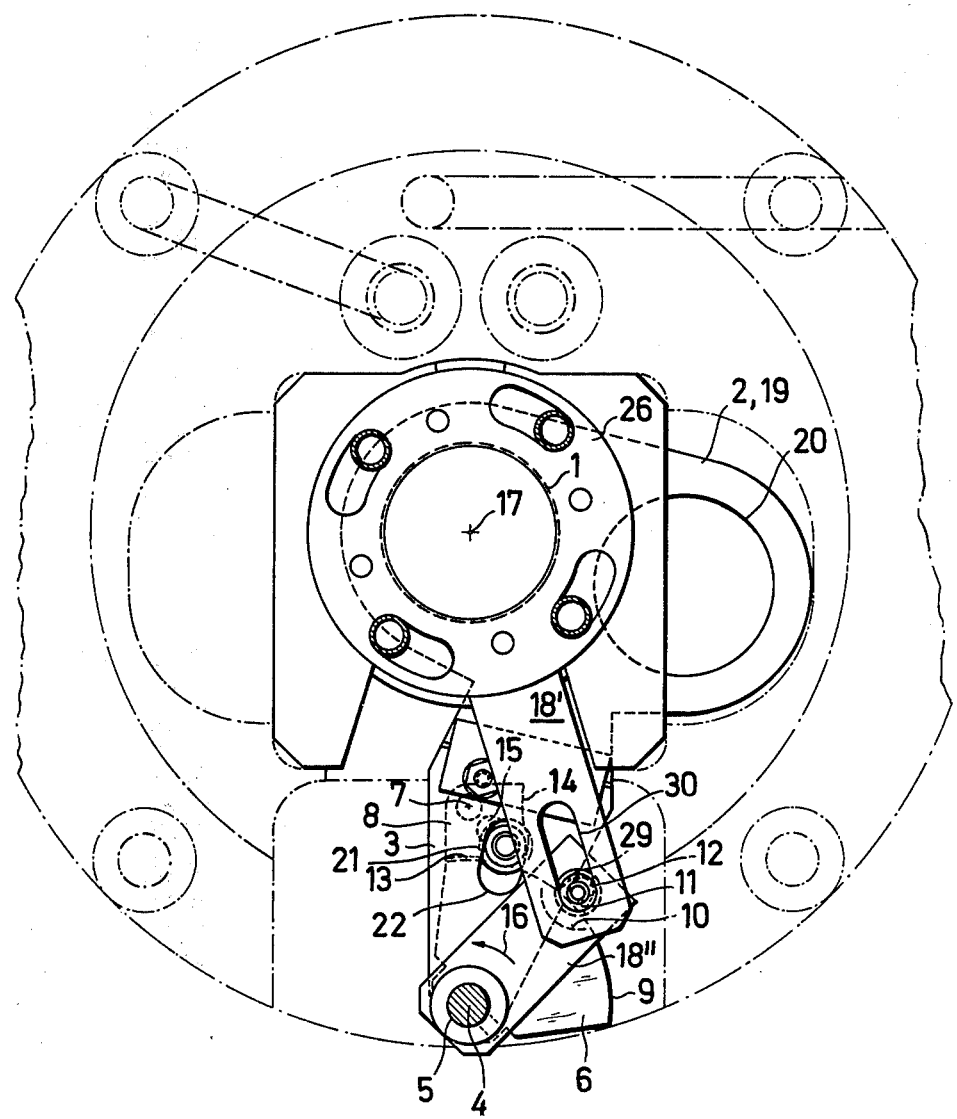
FIGS. 5 and 6 are two different cross sections of a special embodiment.
Figure 6:
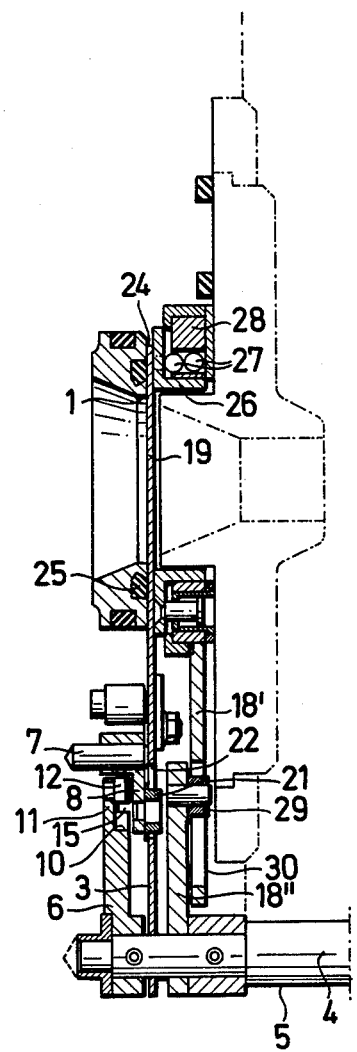

In FIGS. 5 and 6, an embodiment corresponding to the one represented in FIG. 4 is shown in the closed state. Identical parts are given the same reference numbers. In these figures a desirable method of coupling the elements 8 and 9 of the intermittent drive mechanism can be seen, along with those elements which are to perform a certain movement (plate 19 and toggle mechanism).

For the coupling of the movement of the valve plate 19 with that of the tumbler, a roller 21 mounted on the tumbler 8 is provided, which engages a slot 22 in arm 3. This assures that the valve plate 19 will move only when the tumbler 8 also moves.

Regardless of whether the valve plate 19 is in the open or the closed position, it will always be in a slot 24 (visible only in FIG. 6) in the vicinity of the port 1. On the one side of this slot there is provided a gasket 25 which is to be pressed against the valve plate both in its open position and in its closed position. For this purpose there is provided on the other side of the slot 24 a ring 26 which can be pressed against the valve plate 19 by means of a toggle mechanism. In the embodiment represented, a toggle mechanism has been selected which has a plurality of pairs of rollers 27. With these pairs of rollers there are associated cam paths, which are not shown in particular, and which are designed such that the roller pairs will perform movements parallel to the axis of the port 1 when the additional ring 28 surrounding port 1 is rotated. The movement of the roller pairs 27 to the right (with respect to FIG. 6), will therefore produce an unlocking of the valve plate 19; a leftward movement of the roller pairs 27 will produce a locking and a pressing of the valve plate 19 against the gasket 25.

The levers 18' and 18" are provided so as to produce a locking and unlocking action by the rotation of the shaft 5. Lever 18" is affixed to the shaft 5 and has a roller 29 which engages a slot 30 in lever 18'. The lever 18' in turn is connected to the ring 28. By the rotation of the shaft 5, therefore, a rotation of the ring 28 is also produced through the levers 18' and 18". By the appropriate selection of the cam paths determining the movement of the roller pairs 27, the assurance can be provided that the locking and pressing of the valve plate 19 against the gasket 25 will take place only when tumbler plate 8 is at rest, i.e., no swinging movement of the valve plate is taking place.

The embodiment shown in FIGS. 5 and 6 has the advantage that, even when the valve is in the open position, no lateral gap is present into which dirt or the like can penetrate. Even in the case of valves in which there are electrical or magnetic fields adjacent the aperture when they are in the open position, such a system is advantageous because distortions of these fields would be produced by the gap that would otherwise be present. Lastly, an especially shallow construction for a valve can be achieved with the operating mechanism of the invention.

What is claimed is:

1. An operating mechanism for valves and the like, comprising: a housing with a port situated therein which is to be opened and closed; a seat associated with the port; a valve plate for closing the port; rotatable shaft drive means for the valve plate wherein rotation of the shaft in one direction effects movement of the valve plate from its open position to its closed position followed by a pressing movement of the valve plate against the seat, and wherein rotation of the shaft in the other direction effects movement of the valve plate in the opposite direction, the drive means including intermittent drive means for the transformation of the rotatory movement of the shaft to the desired movement of the valve plate comprising a disk pivotable about a first axis in response to rotation of the shaft and having at least a portion of which is a circular cam, a tumbler pivotable about a second axis and having at least one concave edge engageable with the circular cam and means coupling the closing and opening movement with the movement of the tumbler about the second axis and coupling the pressing movement of the valve plate with the movement of the disk about the first axis; locking means coupled with the disk for locking same against the valve seat comprising a ring surrounding the port and a toggle mechanism associated with the ring; and means defining a groove surrounding the port for constantly guiding the plate and wherein the plate includes an aperture which in the open position of the valve is concentric with the port.

2. The operating mechanism of claim 1, wherein the valve plate comprises a pendulum pivoted about the first axis coincident with the longitudinal axis of the shaft, and wherein the pendulum are is coupled with the tumbler.

3. The operating mechanism of claim 2, wherein the coupling means comprises the pendulum arm having an elongated hole and a driver roll mounted on the tumbler and engageable in the elongated hole.

4. The operating mechanism of claim 1, wherein the disk and the tumbler each have symmetrical engaging surfaces and recesses configured to engage with each other and further comprising means coupling the ring to effect a pressing movement both in the open position and in the closed position of the plate.

5. The operating mechanism of claim 1, wherein the disk includes a pin disposed at the intermediate portion of the circular cam and extending parallel to the shaft and wherein the tumbler includes two concave edges and a slot therebetween engageable with the pin to pivot the tumbler about the second pivot axis and engage an alternate concave surface on the circular cam.

* * * * *